United States Patent [19]

Blixt

[11] Patent Number: 5,815,165

[45] Date of Patent: Sep. 29, 1998

[54] GRAPHICS PROCESSOR

[76] Inventor: Stefan Blixt, Hägervägen 10, S-198 00 Bålsta, Sweden

[21] Appl. No.: 157,451

[22] Filed: Nov. 26, 1993

Related U.S. Application Data

[63] Continuation of Ser. No. 627,864, Dec. 17, 1990, abandoned.

[30] Foreign Application Priority Data

Jan. 10, 1990 [SE] Sweden ................................. 9000083

[51] Int. Cl.$^6$ ................................................. G06T 1/20
[52] U.S. Cl. ......................................... 345/506; 345/526
[58] Field of Search .................. 340/799; 395/163–166; 365/230.05; 345/502, 506, 526

[56] References Cited

U.S. PATENT DOCUMENTS

| 4,631,690 | 12/1986 | Corthout et al. | 395/163 X |
| 4,648,045 | 3/1987 | Demetrescu | 395/163 |
| 4,769,715 | 9/1988 | Feldman et al. | 358/350 |
| 4,862,155 | 8/1989 | Dalrymple et al. | 340/799 X |
| 4,866,637 | 9/1989 | Gonzalez-Lopez et al. | 395/163 X |
| 4,945,500 | 7/1990 | Deering | 395/163 X |
| 4,991,110 | 2/1991 | Hannah | 395/166 |
| 5,001,672 | 3/1991 | Ebbers et al. | 365/230.05 |

FOREIGN PATENT DOCUMENTS

A2314440  3/1989  European Pat. Off. .

OTHER PUBLICATIONS

Rosenberg, "Dictionary of Computers, Information Processing & Telecommunications", Second Edition, 1987, John Wiley & Sons Inc.

*Primary Examiner*—Mark K. Zimmerman
*Attorney, Agent, or Firm*—Young & Thompson

[57] ABSTRACT

A graphics processor includes a general graphics processor (30) for converting general graphics instructions into a sequence of primitive pixel oriented instructions, a queue memory (30) for storing the primitive pixel oriented instructions generated by the general graphics processor (30) in the order they are generated, and a primitive graphics processor (32) for reading and executing the primitive pixel oriented instructions in the queue memory (34) one after the other for generating pixels in an image buffer (18).

6 Claims, 2 Drawing Sheets

GRAPHICS PROCESSOR

This application is a continuation, of application No. 7/627,864, filed Dec. 17, 1990, now abandoned.

The present invention relates to a graphics processor, in particular a graphics processor for raster displays.

BACKGROUND OF THE INVENTION

Raster displays intended to manage more than only simple text generally have the whole image stored on pixel level in a memory or buffer, that is if the image has the resolution 1000.1000, than there is a memory cell for each of the 1,000,000 pixels that form the image (pixel=picture element).

For very high resolution raster displays this memory or buffer has to be separate from, that is physically separated from for instance the program and working storage for the corresponding CPU.

However, in connection with the management of the image buffer a number of problems arise.

For instance, it is only possible to write to the image buffer when said buffer is not occupied by reading operations for video generation, since simultaneously writing to the buffer would disturb the video generation (for instance cause so called "snow").

The writing operation is not naturally bound to certain words (groups of bits or pixels), neither words of the length that is used in for instance the bus system or the length that is used during read out for video generation. Often it is desirable to write individual pixels, or rather pixels that are connected in different directions and form lines and curves in the image.

Thus, the word length that the CPU and bus system are built for often is not suitable for data to the image buffer. Furthermore, the drawing operation, that is the operation of writing for instance an inclined line into the image buffer, is of a kind that is not suitable for a common CPU; it does not do justice to the performance of the CPU. Generally several instructions have to be executed for each written pixel.

DESCRIPTION OF THE PRIOR ART

In connection with image generation for very high resolution raster displays, a very high resolution laser printer or laser photo setter (which always work with very high resolution as compared to displays) it has, for the reasons given above, proved to be motivated to use special aids for general graphic functions, such as generation of lines (vectors) and characters/digits (symbols). Such graphics aids are located between the CPU and image buffer.

Such previously known systems are, however, characterised by the fact that read out of video information from the image buffer for the generation of the image on the display has to have priority over, that is has to block, writing of information into the image buffer if an undisturbed image is to be guaranteed and if the video frequency is high, which is the case in a display system with very high resolution. This statement concerns common dynamic memory circuits, so called DRAM. For this reason there are special image buffer circuits, so called video-RAM, which have an extra output from an internal shift register in order to make it possible to read data without blocking the writing operation into the image buffer. However, these circuits are significantly more expensive than common DRAM circuits.

OBJECT OF THE INVENTION

An object of the present invention is to provide a graphics processor, in particular for raster displays, but also for for instance laser printers or laser photo setters, that significantly reduces or eliminates the waiting times in connection with the writing of information into the image buffer.

SUMMARY OF THE INVENTION

The above object is achieved with a graphics processor that is characterized by:

a) a general graphics processor for converting general graphics instructions into a sequence of primitive pixel oriented instructions;

b) a queue memory for storing said primitive pixel oriented instructions generated by said general graphics processor in the order they are generated; and c) a primitive graphics processor for reading and executing said primitive pixel oriented instructions in said queue memory one after the other for generating pixels in an image buffer.

Briefly stated the invention implies that instructions related to graphical operations such as drawing lines, poly lines, circles, writing text, filling areas, erasing windows, etc., by a first processor are converted into a series of instructions that are directly related to the writing of pixels into the image buffer and that are executed by a second processor, a queue memory that is separated from said image buffer being used for storing the last mentioned instructions.

Another way to express this is that a high level processor converts instructions on a higher level to a series of instructions on a lower level, the latter instructions being stored in a queue memory from which they are read and processed by a low level processor for writing pixels into the image buffer.

A preferred embodiment of the graphics processor is characterized by each general graphics instruction corresponding to a micro program in said general graphics processor for converting said general graphics instructions into one or several primitive pixel oriented instructions.

Another preferred embodiment of the graphics processor in accordance with the present invention is characterized by said general graphics processor being integrated with the general processor or CPU.

In accordance with an especially preferred embodiment of the invention said image buffer comprises DRAM-circuits. This feature results in a significantly more inexpensive image buffer than an image buffer comprising video-RAM.

SHORT DESCRIPTION OF THE DRAWING

The invention will be described in detail below with reference with the accompanying drawing, in which FIG. 1 shows a block diagram of the structure of previously known systems with a special graphics processor between the CPU and the image buffer;

FIG. 2 shows a block diagram of a system comprising the graphics processor in accordance with present invention; and FIG. 3 illustrates the conversion of typical general graphics instruction into a series of primitive pixel oriented instructions.

DESCRIPTION OF PREFERRED EMBODIMENTS

Figure 1:
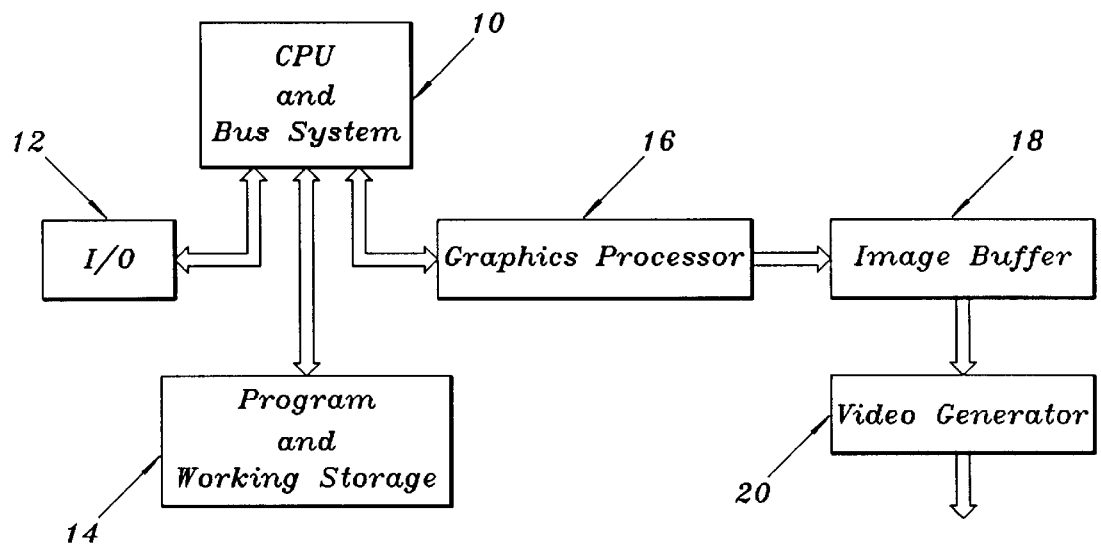

In the figures of the drawing the same reference designations have been used for corresponding elements.

FIG. 1 shows the stucture of a conventional system for a raster display. The system comprises a CPU-unit 10. Connections for data etc. can be shared through a suitably designed bus system. To cover several different possibilities the bus system has been included in CPU block 10 in FIG. 1.

Over said bus system CPU block 10 is connected to in/out-units 12, a program and working storage 14 and a graphics processor 16. Graphics processor 16 is connected to an image buffer 18, which is connected to a video generator 20 for generating a video signal.

Graphics processor 16 receives general graphics instructions of the type "draw lines" (poly line), "fill area", "write text" in accordance with for instance the GKS-standard. With such general graphics instructions the graphics processor then builds the image in image buffer 18. However, this can only be done when video generator 20 does not read from image buffer 18 to generate said video signal, that is in principle only when the ray of the raster display is turned off. Otherwise the writing into image buffer 18 would disturb the image on the display. This means that graphics processor 16 always has to wait for the pauses during which video generator 20 does not read information from image buffer 18 before it can convert said general graphics instructions into pixels in image buffer 18.

The above disadvantage becomes even more disturbing if graphics processor 16 is integrated with the central processing unit CPU, since this CPU when performing general graphics instructions would be blocked until image buffer 18 is available. Thus, during this time period even non-graphical instructions can not be executed.

A preferred embodiment of the present invention will now be described with reference to FIG. 2.

Figure 2:
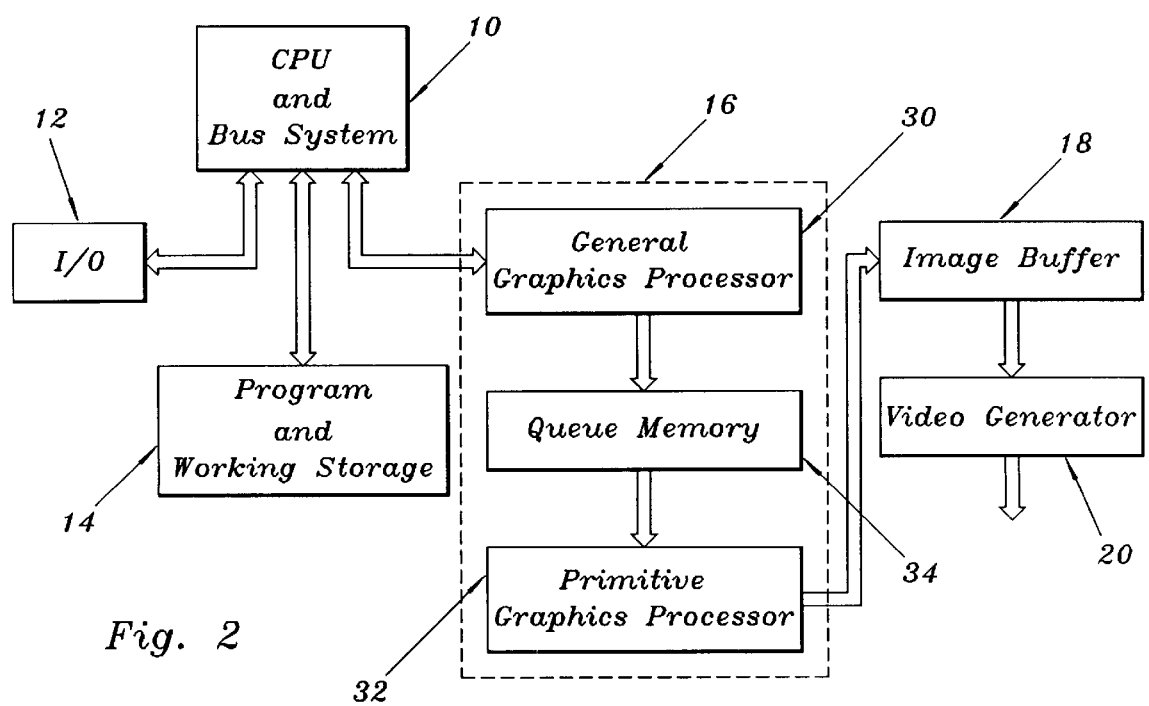

In the embodiment of FIG. 2. graphics processor 16 has been divided into a general graphics processor 30 and a primitive graphics processor 32. General graphics processor 30 receives instructions of the same type as graphics processor 16 in FIG. 1, but does not convert these instructions into pixels to be written into image buffer 18, rather they are converted into primitive pixel oriented instructions that one after the other are put into a so called FIFO or queue memory 34. These primitive pixel oriented instructions, which will be further exemplified below, are then taken care of by said primitive graphics processor for generating the image in image buffer 18.

The advantage with this design is that queue memory 34 is always available for general graphics processor 30, so that processor 30 always can process general graphics instructions without waiting times.

On the other hand, primitive graphics processor 32 can optimally utilize the time periods during which image buffer 18 is available, since these primitive pixel oriented instructions are very simple and therefore require short execution times.

To further speed up general graphics processor 30 each general graphics instruction corresponds to a micro program that directly generates one or several primitive pixel oriented instructions in queue memory 34.

In accordance with a preferred embodiment of the system a description of the image (display list) comprising general graphics instructions with parameters and data is stored in working storage 14. When this description of the image is to be transferred to the display general graphics processor 30 reads instructions from this list to generate primitive pixel oriented instructions to queue memory 34. This can be done in a sequence without waiting times. In case general graphics processor 30 is separate from central processing unit CPU the image generation can even be performed automatically without the aid of CPU programs.

In order to facilitate the understanding of the invention a description of instruction sets for a preferred embodiment of primitive graphics processor 32 is given below.

INSTRUCTION SET FOR PRIMITIVE GRAPHICS PROCESSOR

In the following description of the instruction set of the primitive graphics processor 1 word is assumed to have a lenght of 4 bits.

In a preferred embodiment the primitive graphics processor comprisis the following instruction set:

| OP CODE | MNEMONIC | OPERATION |
|---|---|---|
| 0 | STW | Step West and write |
| 1 | STSW | Step South West and write |
| 2 | STS | Step South and write |
| 3 | STSE | Step South East and write |
| 4 | STN | Step North and write |
| 5 | STNW | Step North West and write |
| 6 | STE | Step East and write |
| 7 | STNE | Step North East and write |
| 8 | WR | Write |
| 9 +3 data | LXPR | Load X-position register |
| A +3 data | LYPR | Load Y-position register |
| B +3 data | LLER | Load length register |
| C +12 data | LPAR | Load pattern register |
| D | — | Reserved for cursor position |
| E + Extended op code | | Extension of instruction set |
| F | NOP | No operation |
| EXTENDED OP CODE | | |
| E0 +2 data | LPSR | Load pen step register |
| E1 +4 data | LPMR | Load pen matrix register |
| E2 +2 data | LMPR | Load memory plane register |
| E4 +2 data | LMMR | Load monitor mode register |
| E5 +4 data | LMAR | Load monitor start address-register |
| E6 +6 data | LMCP | Load monitor cursor position register |
| EF +5 to 129 data | | Binary data transfer |

Writing to Image Buffer

There are 8 instructions without parameters for writing to the image buffer. The writing operation is then controlled by previously given instructions to the primitive graphics processor. The functions that influence the writing operation are the following:

X-coordinate,
Y-coordinate,
Pen register,
Step register,
Pattern register,
Length register.

Positioning

The positioning is done through an X-coordinate and a Y-coordinate. These two together point to the primary writing position in the image buffer. The value for these two coordinates can be between 0 and FFF(H) (0-4095). The position (X,Y)=(0,0) points to the lower left corner and position (X,Y)=(FFF,0) points to the lower right corner.

Loading of X-coordinate

The x-coordinate is loaded by op code 9(H) followed by a 3 word parameter, where said parameter contains the value for the x-coordinate. The first word includes the most significant part of the x-coordinate.

Loading of Y-coordinate

The y-coordinate is loaded by op code A(H) followed by a 3 word parameter, where said parameter contains the value of the y-coordinate. The first word includes the most significant part of the y-coordinate.

Length Register

The length register is used to give the number of times that a following write order is to be repeated. The length is applicable only to the first write order following the loading of the length register. The length can be set up to 4096. The value that is to be loaded is the desired length −1. The length register is loaded through op code B(H) followed by a 3 word parameter. The first word is the most significant part of the value.

Pen Matrix Register

The pen matrix register is used to choose the pixels that are to be influenced by the following write operations. The pen matrix register comprises a matrix of 4.4 bits, that is it is divided into four rows with four columns each. A binary 1 in a matrix position indicates that a writing operation in accordance with the pattern register is to performed. Column 0 in row 0 is the lower left corner of the matrix. This is also the primary write position that is pointed at by the x- and y-position registers. The pen matrix register is loaded through the extended op code El(H) followed by a 4 word parameter. The first word is the information for row 0, with column 0 in bit 3.

Pen Step Register

The pen step register is used to indicate how large the step length is for the x- and y-position register, respectively, that is how much they are to be incremented or decremented before a writing operation is performed. The register comprises 2·4 bits. Bit 3 and 2 are not used, bit 1 and bit 0 indicates the step length in the respective 4 bit part, 00 corresponding to step length 1 and 11 corresponding to step length 4. The pen step register is loaded through the extended op code EO(H) followed by a 2 word parameter that indicates the step length. The first word indicates the step length in x-direction and the second word the step length in y-direction.

Plane Register

The plane register is used to indicate which image buffer planes that are to be included in the following writing operations. The register comprises 4 bits, where bit 3 corresponds to plane 3 and bit 0 corresponds to plane 0. One or several planes can be indicated simultanously. In this register 4 bits are unused.

Pattern Register

The pattern register is used to indicate a pattern that is to be generated during writing to the image buffer. The pattern register is divided into three parts; pattern, start scaling and scaling information. The pattern part indicates which type of writing that is to be performed. The pattern part comprises 16·2 bits (plb,pmb), this pattern being rotated in its register and repeated after 16 times.
00 means write binary 1, that is WHITE
10 means write binary 0, that is BLACK
01 means write opposite value (invert)
11 gives no change The scaling part indicates how many writing operations are to be performed before a new value is to be fetched from the pattern part. The scaling part comprises 8 bits. The start scaling part is used to indicate the scale the first time after loading the pattern register. The start scaling part comprises 8 bits. The pattern register is loaded through the op code C(H) followed by 12 four bit words. Words 1–4 comprise the pattern part for the least significant word and words 5–8 comprise the pattern part for the most significant word in the writing mode. Bit 3 of the first and fifth word correspond to the writing mode for the first pattern value. Words 9–10 comprise the most and least significant word, respectively, of the start scaling part, and words 11–12 comprise the most and least significant word, respectively, of the scaling part. The value of the start scaling and scaling part are formed the desired value −1.

| Op | pattern part | | | | | | | | scaling part | | |
|----|----|----|----|----|----|----|----|----|----|----|----|
| C | pl | pl | pl | pl | pm | pm | pm | pm | ssm | ssl | scm | scl |

| Combination of pm and pl bits | | |
|---|---|---|
| plb | pmb | |
| 0 | 0 | write white |
| 1 | 0 | write black |
| 0 | 1 | invert bit |
| 1 | 1 | inhibit writing | ssm, ssl = starting scale
scm, scl = scale

Monitor Mode Register

The monitor mode register is used to set the monitor logic in different modes. Bits 1,0 can have the following values
00 => normal video presentation
10 => a complete white image is presented
11 => a complete black image is presented When bit 1=1 a writing operation can be performed in the image buffer also during the presentation part. The remaining bits must be 0.

| Op | | param | | |
|----|----|----|----|----|
| E | 4 | mm | ml | mm not used |

| ml | | | |
|----|----|----|----|
| b3 | b2 | b1 | b0 |
| x | x | 0 | 0 | Normal video |
| x | x | 1 | 0 | Only white video |
| x | x | 1 | 1 | Only black video |
| x | 0 | x | x | Activate cursor |

Unused bits should be set = 0

Monitor Start Address Register

This register is used to set the starting point for the image that is to be presented. The starting point is indicated with a x- and an y-value. The starting point corresponds to the upper left corner on the monitor. The x- and y-value comprise 8 bits, respectively. This gives a starting point resolution of 16 pixels. The first word in the parameter corresponds to the most significant word of y.

Monitor Cursor Position Register

This register is used to indicate the location of the cursor of the image buffer. The resolution of the positioning is 4 pixels.

| Op | | parameter | | | | | |
|---|---|---|---|---|---|---|---|
| E | 6 | xm | x | xl | ym | y | yl |

Transfer of Binary Data

In order to obtain an efficient generation of images comprising binary data there is a function where binary data are transferred to the primitive graphics processor in a stream. The op code followed by a length sets the primitive graphics processor in a transparent mode where received data are stored in a buffer. Each word of 4 bits corresponds to data for an x-position and 4 y-positions. The buffer has room for up 128 such words. Received data are then transferred to the image buffer.

| Op | | | Binary data | | | |
|---|---|---|---|---|---|---|
| E | F | 1 | bd | bd | bd | bd |

| | | bd word | | |
|---|---|---|---|---|
| b3 | b2 | | b1 | b0 |
| Y+0 | Y+1 | | Y+2 | Y+3 | b=0 => write white
b=1 => write black

The number of binary data words must be a multiple of 4, so that l (the length) is indicated with a value that corresponds to ¼ of the total number of binary data bits. The transfer to the primitive graphics processor will be performed during presentation, and writing to the image buffer will be performed during the retrace of the ray. Writing to the image buffer is performed in the easterly direction from the point pointed to by x-pos and y-pos and with a step length that is indicated by the pen step register (y-pos must be evenly divisable by 4). Considering the presentation times and generation times in the primitive graphics processor the most efficient transfer is obtained when the entire buffer is utilized.

Having described the instruction and register set of the primitive graphics processor the convertion procedure itself will now be described in detail with reference to FIG. 3.

As an example of a general graphics instruction the instruction "polyline" has been chosen. The example will be concerned with writing a line from the point (100, 100) to the point (10E, 104). These points as well as instructions and data described below are expressed in hexadecimal form.

General praphics processor 30 reads the instruction from working storage 14. The instruction is formed by the following parts.

| 02 | the operation code that indicates that the instruction is "polyline", |
|---|---|
| 01 | indicates line index, in this case line 1, |
| 02 | The number of points on the polyline, that is two in this case, |
| 00 00 | offset in the x-direction from the origin in the current viewing area to the reference point of the points in the polyline, zero in this case, |
| 00 00 | the displacement in the y-direction from the origin in the current viewing area to the reference point for the points of the ployline, zero in this case, |
| 16 35 A0 | a pointer to a data area in the storage that contains the corner points of the polyline. |

Figure 3:
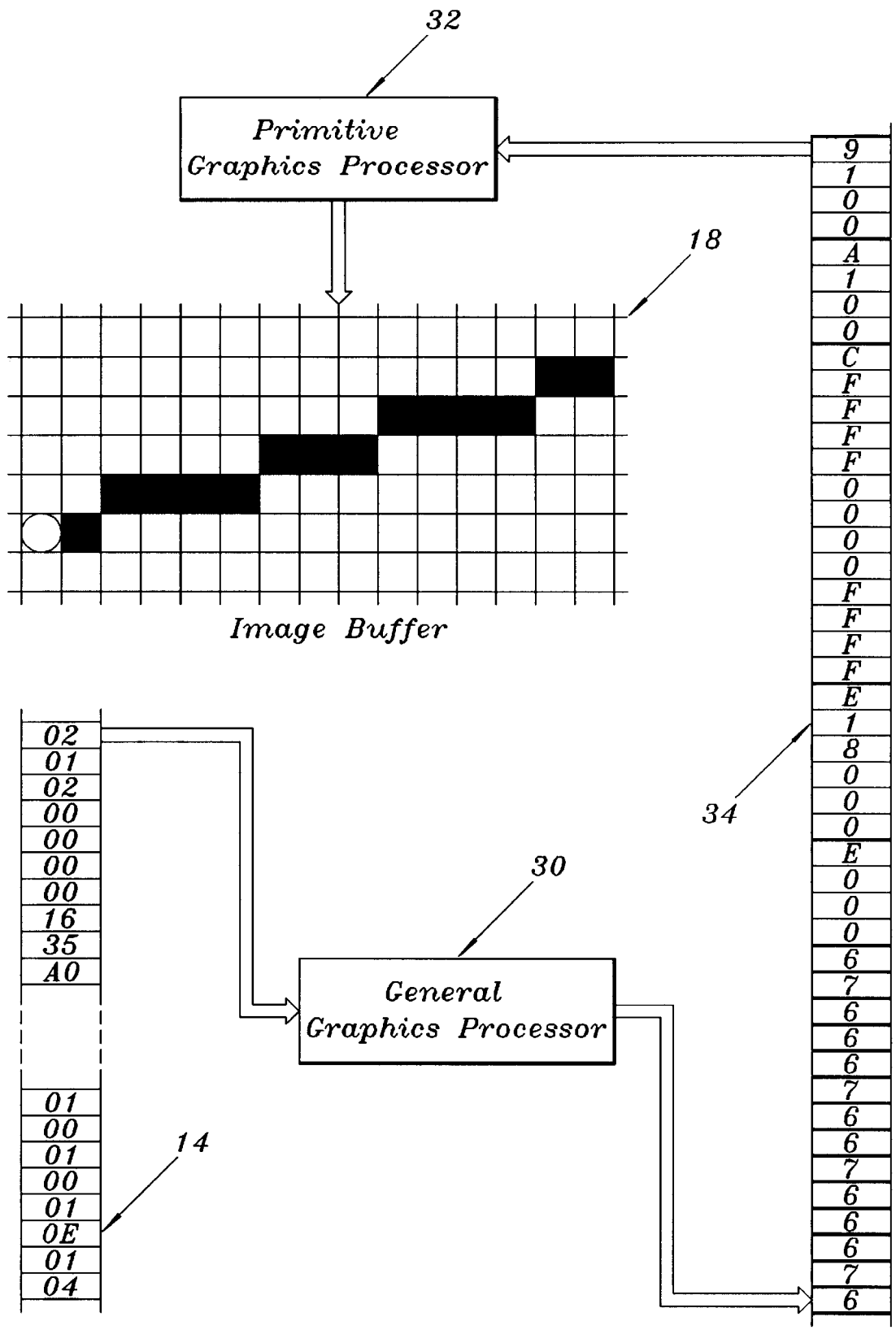

The last mentioned pointer points to the data area that is in the lower part of working storage 14 in FIG. 3. This area contains the x- and y-coordinates for the end points of the above line, that is (0100, 0100, 010E, 0104).

When general graphics processor 30 has read this instruction from working storage 14, the instruction, in the preferred embodiment, is converted directly by a micro program into pixel oriented instructions that are fed into queue memory 34. In order to facilitate the identification of the resulting primitive pixel oriented instructions they have been limited by thicker lines in FIG. 3.

The first two instructions 9 100 and A 100, respectively, load the x- and y-position registers with the starting point of the line. The next instruction, CFFFF0000 FFFF, loads the pattern register with the pattern for a solid line.

The next instruction, E1 80 00, loads the pen matrix register with a binary one in the lower left corner, so that a thin line will be written into the image buffer.

The next instruction, E0 00, loads the pen step register with the value 00, that is the step length is 1 in both the x- and y-direction.

Finally there is a sequence of stepping instructions in the directions east (6) and northeast (7). These steps together with the proceeding preparatory instructions result in the pattern that is shown in FIG. 3 in image buffer 18. In the figure the starting point, which is not filled, has been marked by a circle. From the above example it is appreciated that a general graphics instruction has been converted into a series of very simple primitive and pixel oriented instruction. This conversion procedure often is non-trivial. In this case a line is generated with a line generating algorithm, for instance Bresenhams algorithm, implemented in a micro program. This micro program generates the primitive instructions in queue memory 34. On the other hand, these primitive instructions are very simple and can rapidly be executed by primitive graphics processor 32. Since the primitive instructions can be executed rapidly, the time period when the image buffer is free for writing can be utilized in a more optimal way. On the other hand, queue memory 34 always is available for general graphics processor 30, which means that the general graphics instructions always can be executed.

The structure in accordance with the present invention among other things makes it possible to use so called DRAM-circuits in the image buffer, since the proposed graphics processor is not as sensitive to the blocking of the image buffer during image generation. This implies significant economical advantages, since the video-RAM circuits used in conventional high resolution display systems are approximately three times as expensive as DRAM-circuits.

In the above specification the invention has been described in connection with image generation for a raster display. The same principles can, however, also be used in connection with for instance laser printers or laser photo setter where an entire printed page is built up by pizels stored in an "image buffer". The graphics processor in accordance with the invention therefore is not limited to only raster diplays.

A summerizing comparison of general graphics processor 30 and primitive graphics processor 32 is given below.

The work that general graphics processor 30 performs requires an arithmetic-logic unit, memory for variables and program memory.

The work that primitive graphics processor 32 performs requires logic for efficient writing of pixels into the image buffer.

To illustrate the work done by the different processors in connection with different type of instructions a brief classification of the general graphics instruction is given below.

Area Filling

The work of general graphics processor 30 is concentrated to the corner points of the contour, and the time required is proportional to the number of given points. On the other hand, primitive graphics processor 32 performs the same type of work for each pixel, and the time required is proportional to the area defined by the contour.

During the generation of large areas for instance when a rectangular area is erased, which is a common operation, primitive graphics processor 32 has much more to do than general graphics processor 30. General graphics processor 30 in this situation often will fill queue memory 34 and is then available for new instructions. This feature can for instance be used to start working on the next general graphics instructions or, if the general graphics processor is integrated with the CPU, to perform non-graphical operations.

Drawing of Lines

General graphics processor 30 performs some work for each corner point in a polyline. For lines that use the length register a fixed time is required, which is independent of the length of the line. Primitive graphics processor 32 performs the same work for each pixel, that is the time requirement is proportional to the length of the line.

Writing of Text

General graphics processor 30 performs a certain amount of work for each text symbol to prepare reading and interpretation of data that describe the symbol. The amount of work is the same for the smallest fonts as for the largest. Primitive graphics processor 32 performs certain amount of work for each pixel, that is the time requirement is essentially proportional to the area of the symbol. In this case the advantage with the proposed system is that primitive graphics processor 32 generally does not have to wait for general graphics processor 30 to perform its instruction, but can fetch the instructions that previously already have been stored in queue memory 34.

Thus, it is appreciated that both processes 30, 32 most of the time do not have to wait for each other, which means that the hardware can be more optimally utilized. Therefore the time can be utilized optimally for writing into the image buffer. This is of particular importance in very high resolution dispaly systems with common DRAM-circuits, since primitive processor 32 has access to the image buffer a smaller part of the time.

Furthermore, for instance in connection with a laser photo setter it is important that primitive graphics processor 32 does not have to wait for general graphics processor 30. In this case it is true that the "image buffer" is not blocked since the image only is read once for each print out and not 60–70 times per second as for a display system, but on the other hand the resolution for a laser photo setter is very much higher which means primitive graphics processor 32 will have much more to do and has to work as efficient as possible for obtaining best performance.

Furthermore, the invention has been described in connection with a monocrome system, but the invention is equally applicable to colour systems. In such systems the image buffer usually is divided into bit plains, where each bit plane is treated as a monocrome system. Furthermore it is appreciated that use of DRAM-circuits in a colour system would imply even greater savings as compared to a conventionell system with the same resolution.

I claim:

1. A graphics processor for writing information representing at least a part of an image into an image buffer of predetermined size, comprising:

(a) high level graphics processor means for converting high level graphics instructions into low level graphics instructions, at least some of which contain pixel data;

(b) queue memory means connected to said high level graphics processor means, for receiving and storing said low level graphics instructions in the order they are generated by said high level graphics processor means; and (c) low level graphics processor means connected to said queue memory means and said image buffer, for reading and executing said low level graphics instructions from said queue memory means one after the other and for repeatedly copying at least some of said pixel data into different memory locations of said image buffer corresponding to different positions in said image as specified by said low level graphics instructions.

2. The graphics processor for writing information into an image buffer of claim 1 wherein each high level graphics instruction corresponds to a micro program in said high level graphics processor means for converting said high level graphics instruction into low level graphics instruction including one or several low level pixel data generating instructions.

3. The graphics processor for writing information into an image buffer of claim 1, wherein said high level graphics processor means is functionally integrated with a general purpose processor.

4. The graphics processor for writing information into an image buffer of claim 3, wherein said high level graphics processor means is physically integrated with said general purpose processor.

5. The graphics processor for writing information into said image buffer of claim 1 wherein said image buffer comprises DRAM-circuits.

6. The graphics processor for writing information into an image buffer of claim 5, wherein said image buffer is connected to a display controller to display an image on a display and wherein said low level graphics processor means writes pixel data to said image buffer only during time periods when said display controller does not read pixel data from said image buffer.

* * * * *